Oct. 11, 1949.　　　　　C. W. SINCLAIR　　　　　2,484,533
WHEEL
Filed Aug. 21, 1945

INVENTOR.
Charles W. Sinclair
BY Whittemore Hulbert & Belknap,
Attorneys

Patented Oct. 11, 1949

2,484,533

UNITED STATES PATENT OFFICE 2,484,533

WHEEL

Charles W. Sinclair, Detroit, Mich., assignor to Kelsey-Hayes Wheel Company, Detroit, Mich., a corporation of Delaware Application August 21, 1945, Serial No. 611,802

5 Claims. (Cl. 301—63)

The invention relates to wheels and refers more particularly to motor vehicle wheels.

The invention has for one of its objects to so construct a wheel that it is relatively light in weight and at the same time strong to safely carry the load for which it is designed.

The invention has for another object to so construct the wheel that it has a peripherally divided rim to facilitate applying and removing a tire.

The invention has for a further object to so construct the wheel that it provides a simple mounting for a cover.

Figure 1:
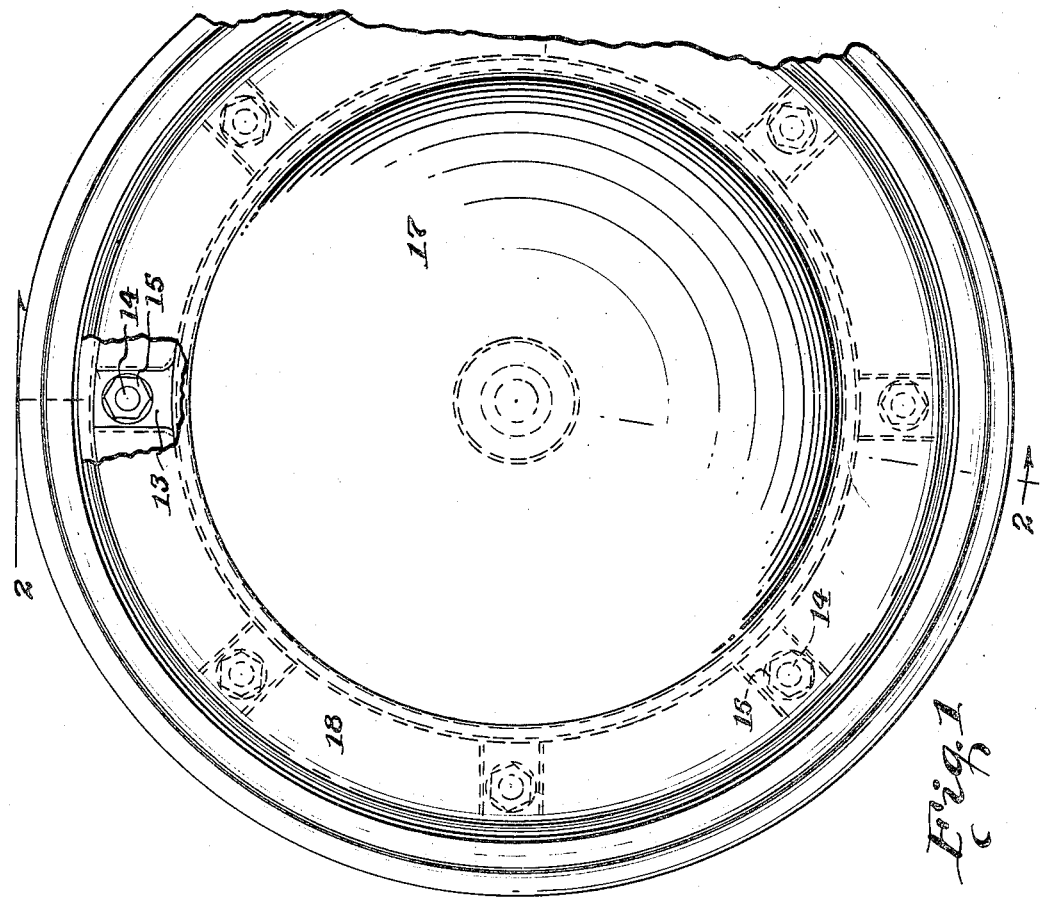
Figure 2:
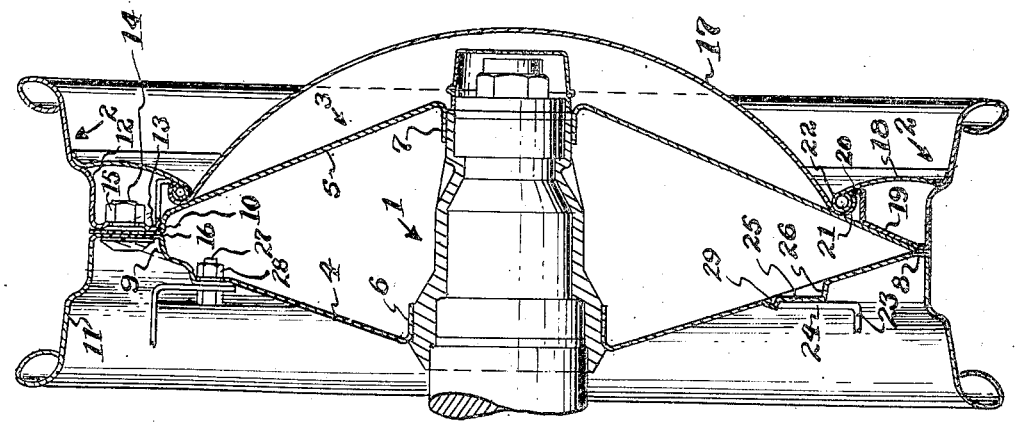

These and other objects of the invention will become apparent from the following description, taken in connection with the accompanying drawings, in which Figure 1 is an elevation, partly broken away, of a wheel embodying the invention;

Figure 2 is a cross section on the line 2—2 of Figure 1.

The wheel is designed particularly for use as a motor vehicle wheel and comprises the hub 1, the rim 2 and the wheel body 3 between the hub and rim.

The wheel body 3 comprises the discs 4 and 5 having the axially spaced flanged central portions 6 and 7, respectively, which are mounted on and secured to the end portions of the hub preferably by being brazed thereto. These discs converge radially outwardly from the hub and have their peripheral portions 8 which are located immediately adjacent the rim 2 in contact radially inwardly from the contacting peripheral portions. The discs have the angularly spaced substantially opposed pockets 9 and 10, respectively, extending radially inwardly from the contacting peripheral portions, the bottoms of the pockets being in contact substantially in the central plane of the wheel.

The rim 2 is a drop-center rim and comprises the rim portion 11 which is integral with and extends from the contacting peripheral portion of the disc 4. The rim also comprises the complementary rim portion 12 which is detachably secured to the wheel body formed of the discs 4 and 5. More particularly, the rim portion 12 has the parts 13 which fit in the pockets 10 of the disc 5. Bolts 14 extending axially through the bottoms of the pockets 9 and 10 and the bottoms of the parts 13 and nuts 15 threaded on the bolts detachably secure the rim portion 12 to the wheel body. The bolts are preferably permanently secured to the discs 4 and 5 by staking the bolts at 16 against the bottoms of the pockets 10.

For the purpose of mounting the covers 17 and 18 on the wheel, the parts 19 of the complementary rim portion 12 which are located between the parts 13 are formed with the resilient flanges 20 which are engageable with the edges of the nested annular beads 21 and 22 of the covers 17 and 18, respectively.

The brake drum 23 is formed with the generally radially extending web 24 which is secured against the flat face 25 of an annular boss 26 formed in the disc 4 by suitable means such as the bolts 27 and nuts 28. The brake drum is preferably centered by means of the annular series of bosses 29 formed in the disc 4 and engageable with the radially inner edge of the web 24. With this construction the converging parts of the discs between the pockets of the discs serve to reinforce the wheel body. Also the complementary rim portion forms a resilient mounting for the covers and upon removal of the covers may be readily removed to permit the tire to be removed or replaced.

What I claim as my invention is:

1. A motor vehicle wheel having a hub, a wheel body comprising converging discs having axially spaced central portions secured to said hub and contacting peripheral portions, said discs having angularly spaced substantially opposed pockets extending radially inwardly from said contacting peripheral portions, a rim portion integral with and extending from one of said discs, a complementary rim portion having parts engageable within the pockets of one of said discs, and means for securing said complementary rim portion to said wheel body comprising means extending through the bottoms of said pockets and said parts.

2. A motor vehicle wheel having a hub, a wheel body comprising converging discs having axially spaced central portions secured to said hub and contacting peripheral portions, said discs having angularly spaced substantially opposed pockets extending radially inwardly from said contacting peripheral portions, a rim portion integral with and extending from one of said discs, a complementary rim portion having parts engageable within the pockets of one of said discs and parts for detachably receiving a cover, and means for securing said complementary rim portion to said wheel body comprising means extending through the bottoms of said pockets and said parts.

3. A vehicle wheel having a hub, a wheel body comprising converging discs having axially spaced central portions secured to said hub and contacting peripheral portions, a rim portion integral with and extending from one of said discs, a detachable complementary rim portion and means for detachably securing said complementary rim portion to said wheel body, said complementary rim portion having radially movable resilient means radially inwardly of said securing means for detachably securing a cover.

4. A vehicle wheel, having a hub, a wheel body comprising converging discs having axially spaced central portions secured to said hub and contacting peripheral portions, said discs having angularly spaced substantially opposed pockets extending radially inwardly from said contacting peripheral portions, a rim portion integral with and extending from one of said discs, a complementary rim portion having parts engageable within the pockets of one of said discs, means extending through the bottoms of said pockets and said parts for securing said complementary rim portion to said wheel body, and resilient means on said complementary rim portion located between said parts and radially inwardly of said securing means for detachably receiving a cover.

5. A vehicle wheel having a hub, a wheel body comprising converging discs having axially spaced central portions secured to said hub and contacting peripheral portions, complementary rim portions on said wheel body, and means for detachably securing one of said rim portions to said wheel body, said last mentioned rim portion having yieldable flange means radially inwardly of said securing means for detachably securing a cover.

CHARLES W. SINCLAIR.

REFERENCES CITED

The following references are of record in the file of this patent:

UNITED STATES PATENTS

| Number | Name | Date |
|---|---|---|
| 1,255,927 | Putnam | Feb. 12, 1918 |
| 1,382,672 | Racer | June 28, 1921 |
| 1,415,427 | Betzell | May 9, 1922 |
| 2,155,988 | Burger | Apr. 25, 1939 |
| 2,158,125 | Horn | May 16, 1939 |
| 2,187,777 | Gannett | Jan. 23, 1940 |
| 2,351,655 | Aske | June 20, 1944 |